(12) United States Patent
Jenks et al.

(10) Patent No.: US 6,483,697 B1
(45) Date of Patent: Nov. 19, 2002

(54) NESTED FLIP COVER LID FOR A HAND-HELD COMPUTING SYSTEM

(75) Inventors: Kenneth Jenks, Capitola; Troy Hulick; Huy Nguyen, both of San Jose; Steven Shiozaki, Belmont, all of CA (US)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 09/870,264

(22) Filed: May 29, 2001

(51) Int. Cl.$^7$ ................................................ G06F 1/16
(52) U.S. Cl. ...................... 361/683; 361/724; 190/903; 281/36
(58) Field of Search ................................ 361/683–687, 361/724–727; 604/294; 281/36; 206/305; 190/109, 903; 364/708

(56) References Cited

U.S. PATENT DOCUMENTS

| | | | | |
|---|---|---|---|---|
| 5,980,497 A | * | 11/1999 | Yavitz | 604/294 |
| 6,209,917 B1 | * | 4/2001 | Welch | 281/36 |
| 6,266,240 B1 | * | 7/2001 | Urban et al. | 361/686 |
| 6,295,198 B1 | * | 9/2001 | Loh et al. | 361/683 |
| 6,324,055 B1 | * | 11/2001 | Kawabe | 361/687 |

\* cited by examiner

*Primary Examiner*—Darren Schuberg
*Assistant Examiner*—Hung Van Duong
(74) *Attorney, Agent, or Firm*—Wagner, Murabito & Hao LLP

(57) ABSTRACT

One embodiment in accordance with the present invention includes a nested flip cover lid for a portable computing system such as a personal digital assistant (PDA). Specifically, the nested flip cover lid includes an accessory rail spine, a hinge and a rigid material that is fabricated to nest within the top cover parameter bevels surrounding the display device of the portable computing system. Therefore, the nested flip cover of the portable computing system is designed and fabricated in order to add a minimal amount of thickness (e.g., 1 millimeter) to the overall portable computing system package. Furthermore, the nested flip cover may also be integrated with a latching mechanism in order to secure the nested flip cover closed when the portable computing system is not being used. In this manner, the latching mechanism keeps the nested flip cover aligned with the outer parameter of the portable computing system.

30 Claims, 17 Drawing Sheets

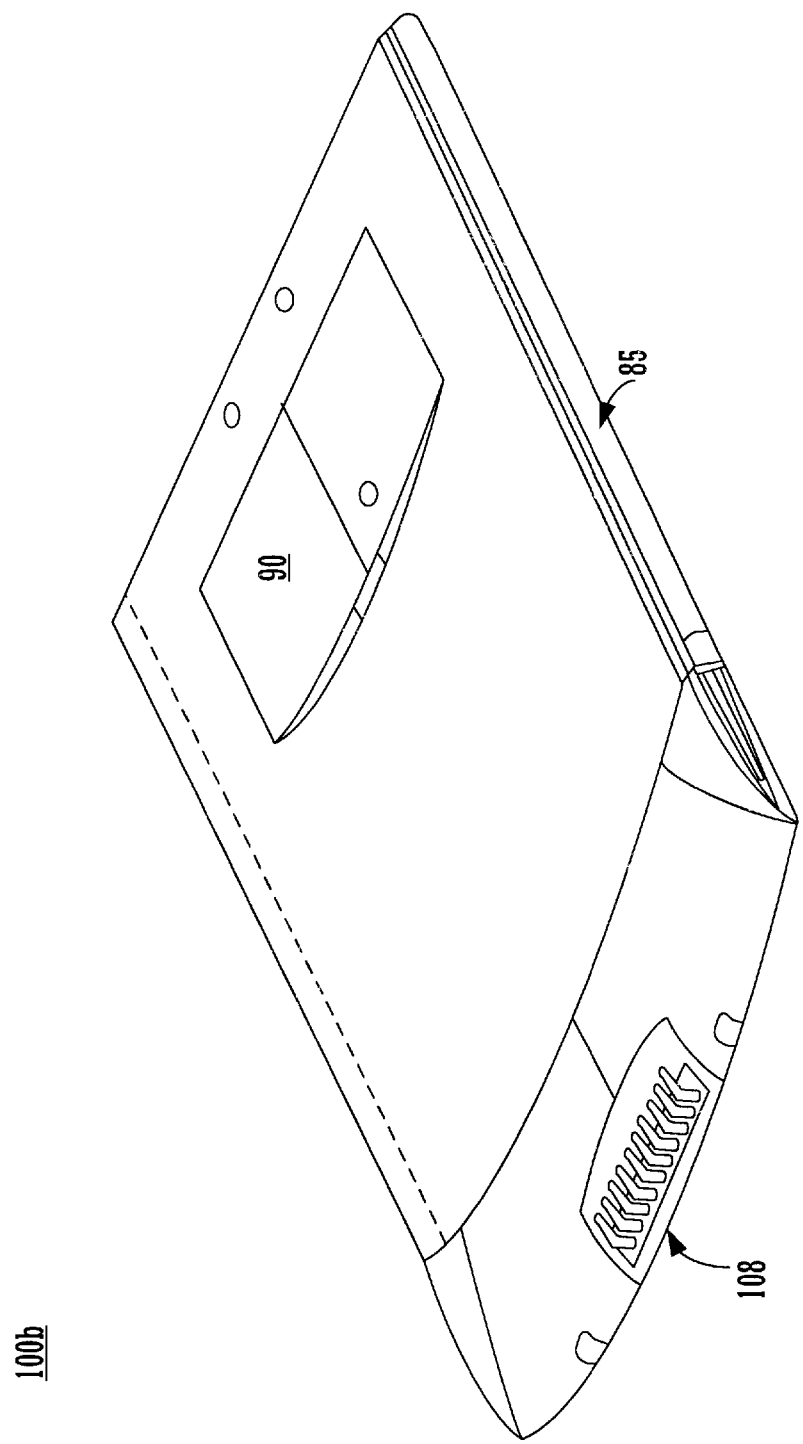

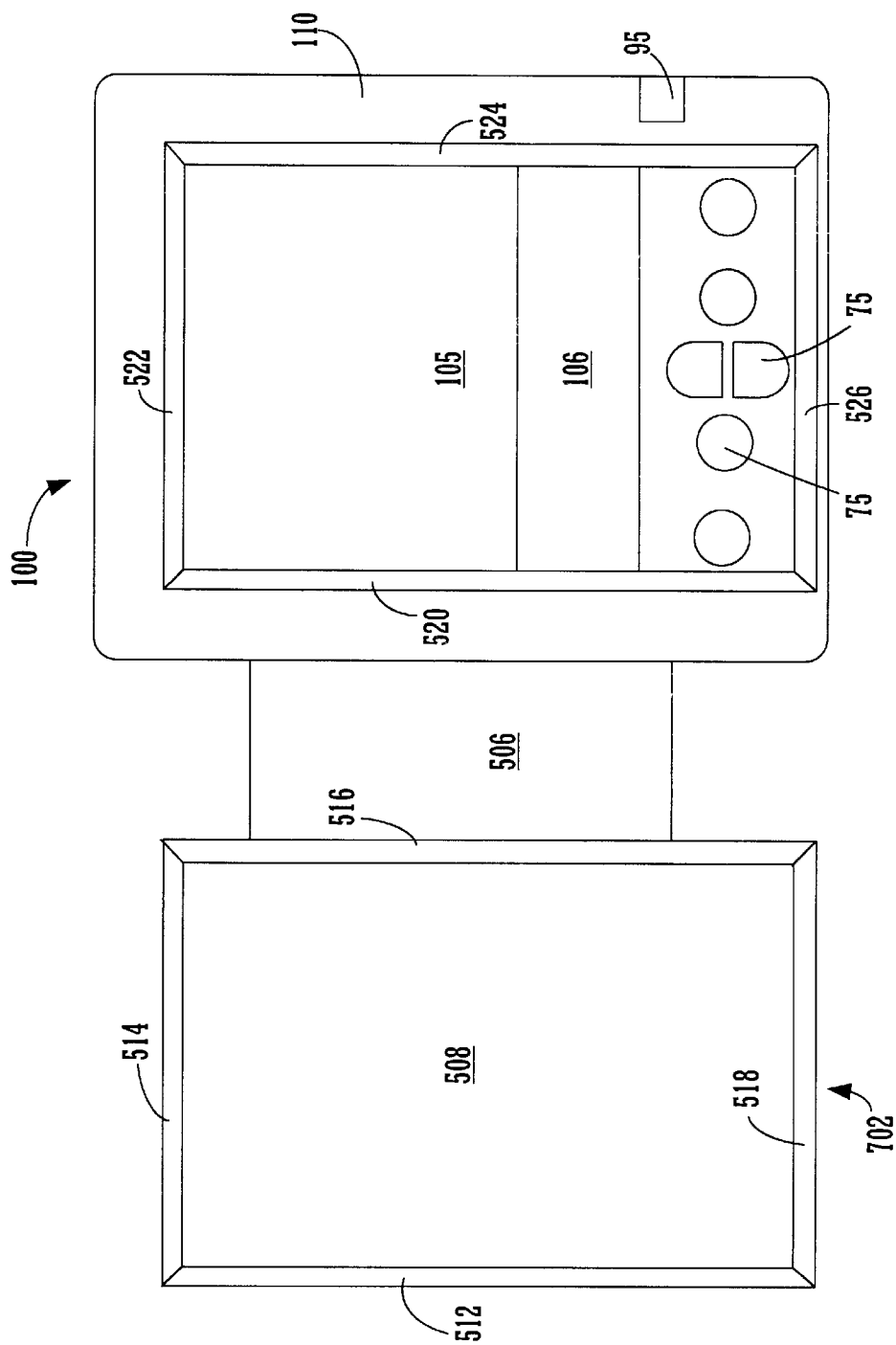

1000

```
                    ┌─────────┐
                    │  START  │
                    └────┬────┘
                         ▼
    ┌──────────────────────────────────────────────────┐
    │ DESIGN AND FABRICATE A FLIP COVER RAIL SPINE TO   │
    │ ATTACH TO A PORTABLE COMPUTING SYSTEM             │
    │                    1002                           │
    └──────────────────────┬───────────────────────────┘
                           ▼
    ┌──────────────────────────────────────────────────┐
    │ ATTACH THE FLIP COVER RAIL SPINE TO A HINGE       │
    │ MATERIAL WHICH IS ABOUT THE SIZE OF THE DESIRED   │
    │ FLIP COVER                                        │
    │                    1004                           │
    └──────────────────────┬───────────────────────────┘
                           ▼
    ┌──────────────────────────────────────────────────┐
    │ FABRICATE A RIGID LAYER HAVING A RAISED AREA THAT │
    │ MAY NEST WITHIN PARAMETER BEVELS OF A TOP COVER   │
    │ THAT SURROUND A DISPLAY DEVICE OF THE PORTABLE    │
    │ COMPUTING SYSTEM                                  │
    │                    1006                           │
    └──────────────────────┬───────────────────────────┘
                           ▼
    ┌──────────────────────────────────────────────────┐
    │ ATTACH THE RIGID LAYER TO THE HINGE MATERIAL TO   │
    │ FORM A NESTED FLIP COVER FO RTHE PORTABLE         │
    │ COMPUTING SYSTEM                                  │
    │                    1008                           │
    └──────────────────────┬───────────────────────────┘
                           ▼
    ┌──────────────────────────────────────────────────┐
    │ ATTACH THE NESTED FLIP COVER TO THE PORTABLE      │
    │ COMPUTING SYSTEM                                  │
    │                    1010                           │
    └──────────────────────┬───────────────────────────┘
                           ▼
                    ┌─────────┐
                    │   END   │
                    └─────────┘
```

FIGURE 10

NESTED FLIP COVER LID FOR A HAND-HELD COMPUTING SYSTEM

TECHNICAL FIELD

The present invention generally relates to the field of electronic devices. More particularly, the present invention relates to the field of personal digital assistants (PDAs) or other types of portable electronic devices.

BACKGROUND INFORMATION

Computers and other electronic devices have become integral tools used in a wide variety of different applications, such as in finance and commercial transactions, computer-aided design and manufacturing, health care, telecommunication, education, etc. Computers along with other electronic devices are finding new applications as a result of advances in hardware technology and rapid development in software technology. Furthermore, the functionality of a computer system or other type of electronic device is dramatically enhanced by coupling these type of stand-alone devices together in order to form a networking environment. Within a networking environment, users may readily exchange files, share information stored on a common database, pool resources, and communicate via electronic mail (e-mail) and via video teleconferencing. Furthermore, computers along with other types of electronic devices which are coupled to the Internet provide their users access to data and information from all over the world. Computer systems have become useful in many aspects of everyday life both for personal and business uses.

Included within this broad category of computers and electronic devices is the personal digital assistant (commonly referred to as a PDA). Specifically, as the components required to build a computer system have been greatly reduced in size, new categories of computer systems have emerged. One of these new categories of computer systems is the personal digital assistant. A personal digital assistant is a portable computer system which is small enough to be held in the hand of its user and can be "palm-sized."

Since personal digital assistants are very small, full-sized keyboards are generally not efficient input devices. For instance, personal digital assistants using keyboards usually have keyboard devices that are so small that a user typically cannot touch-type on them. Many personal digital assistants employ a stylus and a digitizer pad as an input system. The stylus and digitizer pad work well for personal digital assistants because the arrangement allows a user to hold the personal digital assistant in one hand while writing with the stylus onto the digitizer pad with the other hand. A small on-screen keyboard image can also be used for data entry. Because of the elimination of the keyboard, personal digital assistants are very portable and tend to be carried by the user wherever they go, including on travel.

Furthermore, the personal digital assistant is usually a battery powered device that is typically used as an electronic organizer having the capability to store and display a wide range of information which can include numerous addresses and telephone numbers of business and personal acquaintances, financial information, daily appointments, a "to do" list, along with various other personal information. In this manner, the personal digital assistant is able to consolidate a variety of information which is easily accessible by its user. Therefore, personal digital assistants are very useful and powerful devices.

It should be appreciated that there are disadvantages associated with personal digital assistants. For example, when a typical personal digital assistant is implemented with a standard flip cover that protects its display screen, digitizer, and functional buttons, the personal digital assistant package becomes undesirably thicker and bulkier. Specifically, the companies that manufacture personal digital assistants are continuously competing to produce thinner devices which are more desirable to their customers. However, the standard flip cover for a personal digital assistant typical adds an additional 4–5 millimeters (mm) of unwanted thickness to the personal digital assistant package. As such, the typical personal digital assistant having a standard flip cover is undesirably thicker and bulkier.

Another disadvantage associated with a personal digital assistant is that its flip cover may not remain aligned with its outer parameter thereby revealing one or more of its buttons. Specifically, a typical flip cover hinge of a personal digital assistant may be fabricated from a pliable material (e.g., leather). As this pliable hinge material becomes worn with use, the flip cover is adversely allowed to sag and become misaligned with the outer parameter of its personal digital assistant. Therefore, the misaligned flip cover may expose a button of the personal digital assistant such as its power button which can be inadvertently activated thereby draining the power of the personal digital assistant.

SUMMARY OF THE INVENTION

Accordingly, a need exists for a method and apparatus that provides a flip cover to a personal digital assistant that adds a minimal amount of thickness to the personal digital assistant. Furthermore, a need exists for a method and apparatus that satisfies the above need and also restricts the flip cover from becoming misaligned with the outer parameter of its personal digital assistant. The present invention provides a method and apparatus which accomplishes the above mentioned needs.

For example, one embodiment in accordance with the present invention includes a nested flip cover lid for a portable computing system such as a personal digital assistant (PDA). Specifically, the nested flip cover lid includes an accessory rail spine, a hinge and a rigid material that is fabricated to nest within the top cover parameter bevels surrounding the display system of the portable computing system. Therefore, the nested flip cover of the portable computing system is designed and fabricated in order to add a minimal amount of thickness (e.g., 1 millimeter) to the overall portable computing system package. Furthermore, the nested flip cover may also be integrated with a latching mechanism in order to secure the nested flip cover closed when the portable computing system is not being used. In this manner, the latching mechanism keeps the nested flip cover aligned with the outer parameter of the portable computing system.

In another embodiment, the present invention includes a flip cover for covering a portion of a front surface of a portable computing system. The flip cover includes an apparatus for attaching to the portable computing system. Furthermore, the flip cover includes a hinge material attached to the apparatus. Additionally, the flip cover includes a material forming a raised area that is for nesting within display parameter bevels of a top cover of the portable computing system. It is understood that the material is attached to the hinge material.

The present invention provides these advantages and others which will no doubt become obvious to those of ordinary skill in the art after having read the following detailed description of embodiments in accordance with the present invention.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 2B is a perspective illustration of one embodiment of a bottom side of the portable computer system of FIG. 2A.

FIG. 7B is a top view of the nested flip cover of FIG. 7A attached to the portable computing system in accordance with an embodiment of the present invention.

FIG. 10 illustrates a flowchart of steps performed in accordance with one embodiment of the present invention for designing and fabricating a flip cover lid that nests within parameter bevels of a top cover of a portable computing system.

The drawings referred to in this description should not be understood as being drawn to scale except if specifically noted.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Although the nested flip cover of the present invention may be implemented with a variety of different electronic systems such as a pager, a mobile phone, a calculator, a personal digital assistant (PDA), etc., one exemplary embodiment includes the integration of the nested flip cover with a portable computing system. It should be understood that the descriptions corresponding to FIGS. 1–4 provide some general information about an exemplary portable computing system.

Figure 1:
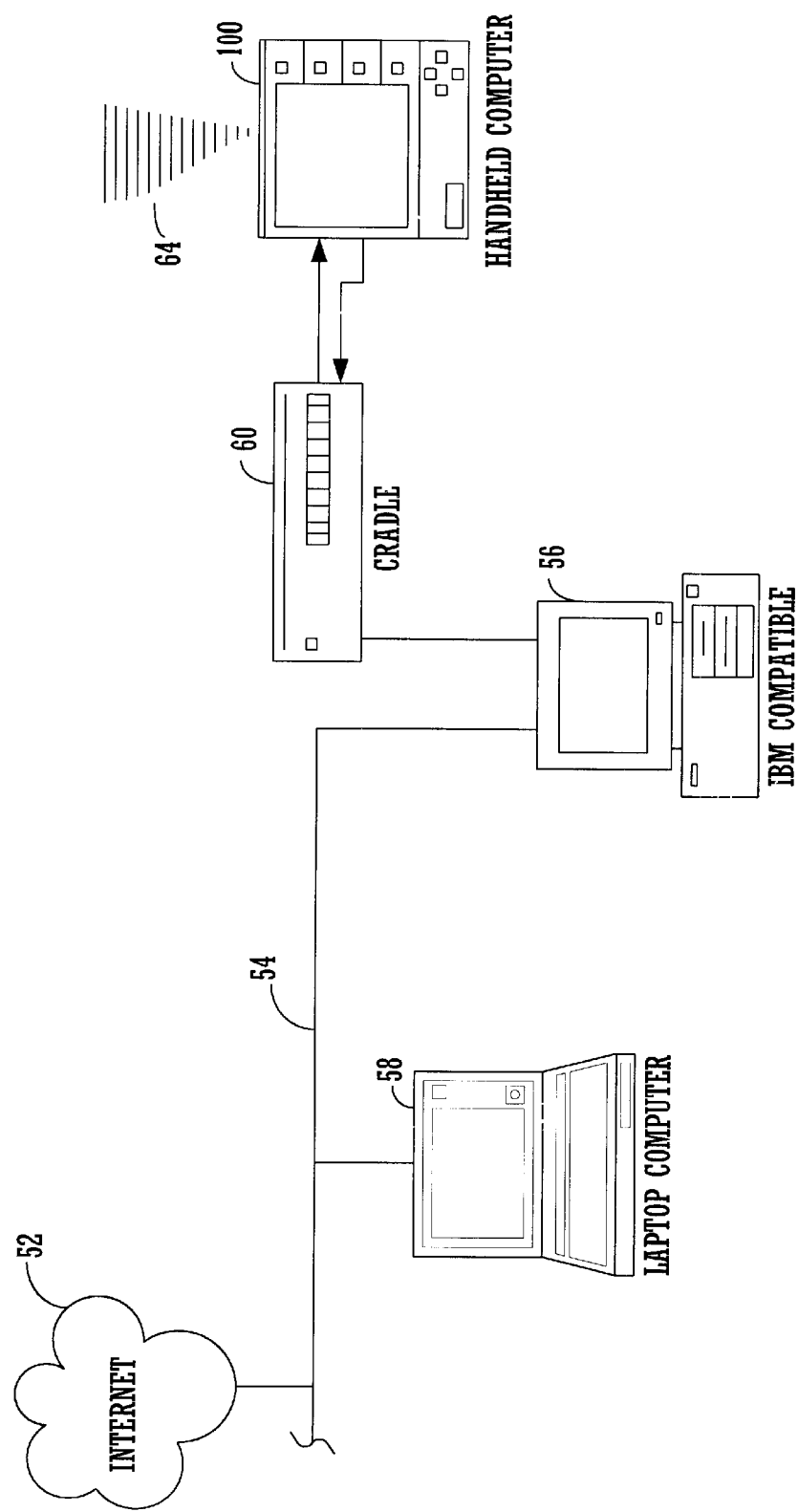
FIG. 1 is a system illustration of a portable computing system connected to other computer systems and the Internet via a cradle device.

FIG. 1 illustrates a system 50 that may be used in conjunction with an exemplary portable computing device 100. Specifically, system 50 comprises a host computer system 56 which can either be a desktop unit as shown, or, alternatively, can be a laptop system 58. Optionally, one or more host computer systems can be used within system 50. Host computer systems 56 and 58 are shown connected to a communication bus 54, which in one embodiment can be a serial communication bus, but could be of any of a number of well known communication standards and protocols, e.g., a parallel bus, Ethernet, Local Area Network (LAN), and the like. Optionally, bus 54 can provide communication with the Internet 52 using a number of well known protocols.

Importantly, bus 54 is also coupled to a cradle 60 for receiving and initiating communication with portable computing device 100. Cradle 60 provides an electrical and mechanical communication interface between bus 54 (and anything coupled to bus 54) and the portable computer system 100 for two way communications. Computer system 100 also contains a wireless infrared communication mechanism 64 for sending and receiving information from other devices.

Figure 2A:
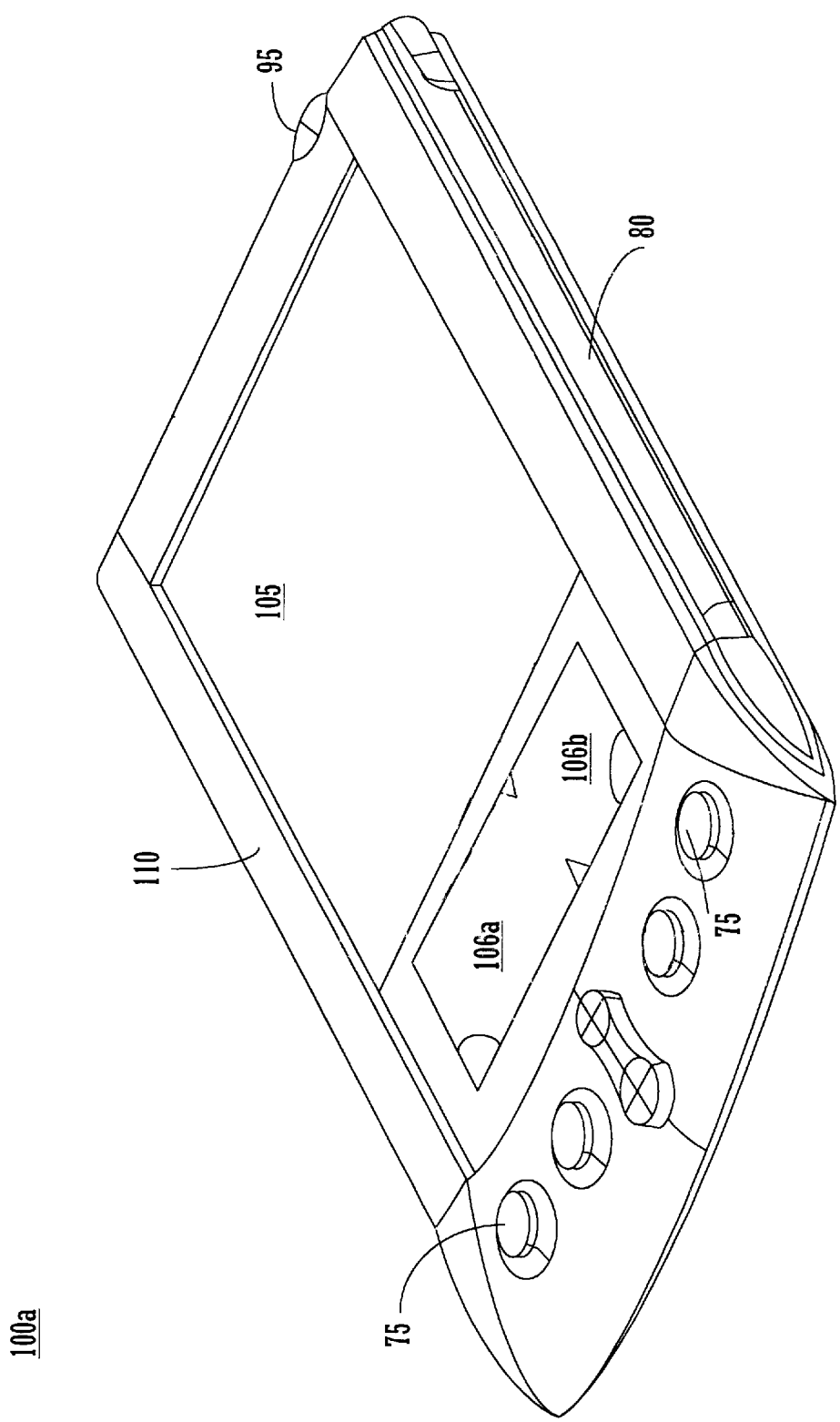
FIG. 2A is a perspective illustration of the top face of an exemplary portable computer system.

FIG. 2A is a perspective illustration of the top face 100a of an exemplary portable computer system 100. The top face 100a contains a display screen 105 surrounded by a top cover 110. A removable stylus 80 is also shown. The display screen 105 is a touch screen able to register contact between the screen and the tip of the stylus 80. Additionally, the stylus 80 can be fabricated of any material to make contact with the screen 105. The top face 100a also contains one or more dedicated and/or programmable buttons 75 for selecting information and causing the computer system 100 to implement functions. The on/off button 95 is also shown.

FIG. 2A also illustrates a handwriting recognition pad or "digitizer" containing two regions 106a and 106b. For example, region 106a is for the drawing of alpha characters therein for automatic recognition while region 106b is for the drawing of numeric characters therein for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

FIG. 2B is a perspective illustration of one embodiment of a bottom side 100b of portable computer system 100. An optional extendible antenna 85 is shown and also a battery storage compartment door 90 is shown. A communication interface 108 is also shown. In one embodiment of the present invention, the communication interface 108 is a serial communication port, but could also alternatively be of any of a number of well known communication standards and protocols, e.g., parallel, small computer system interface (SCSI), Ethernet, FireWire (IEEE 1394), Universal Serial Bus (USB), etc.

Figure 3:
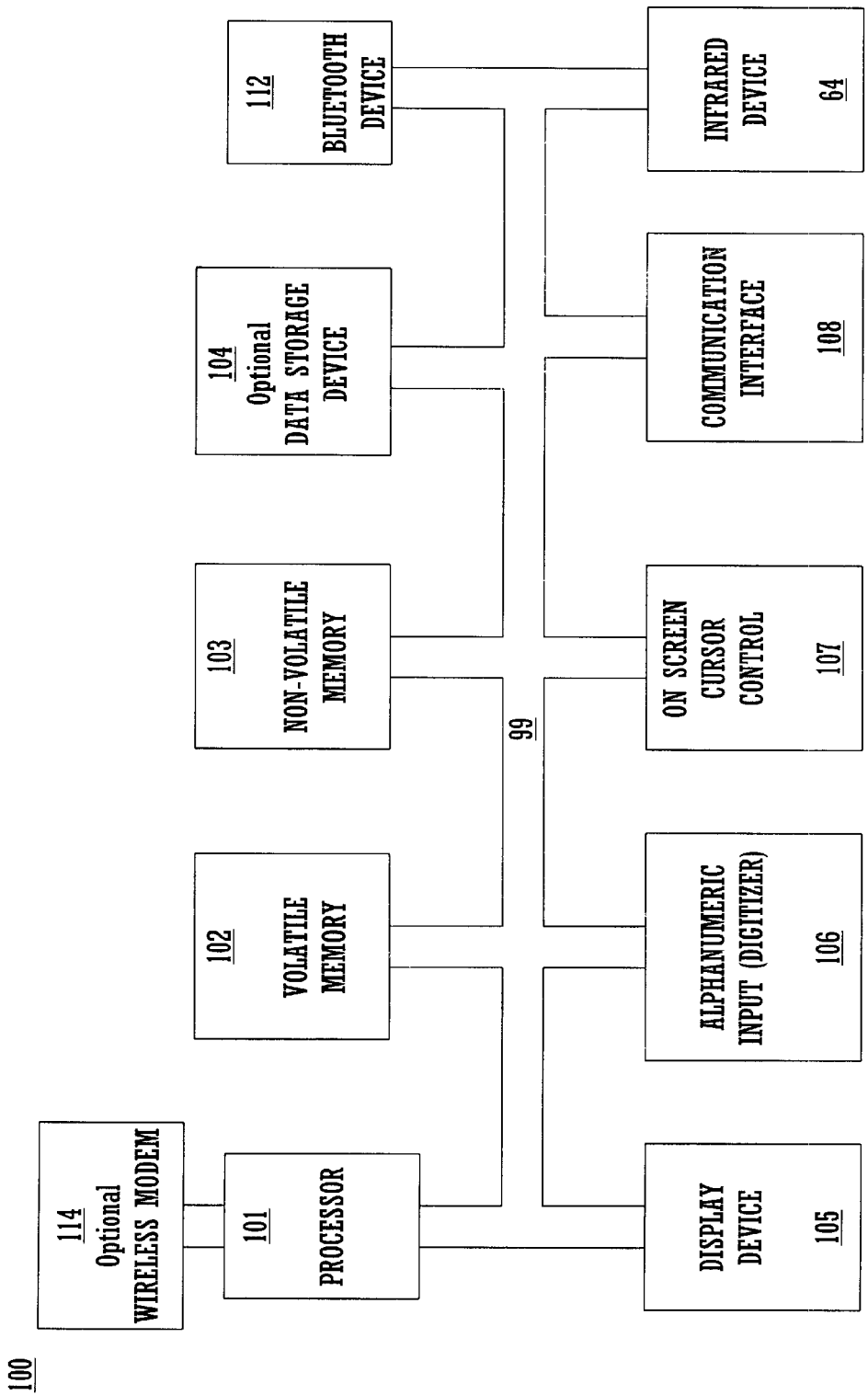
FIG. 3 is a block diagram of exemplary circuitry of a portable computing system in accordance with one embodiment of the present invention.

FIG. 3 is a block diagram of exemplary circuitry of portable computing system 100 in accordance with one embodiment of the present invention. The computer system 100 includes an address/data bus 99 for communicating information, a central processor 101 coupled with the bus 99 for processing information and instructions. It is appreciated that central processor unit 101 may be a microprocessor or any other type of processor. The computer system 100 also includes data storage features such as a volatile memory 102 (e.g., random access memory, static RAM, dynamic RAM, etc.) coupled with the bus 99 for storing information and instructions for the central processor 101 and a non-volatile memory 103 (e.g., read only memory, programmable ROM, flash memory, EPROM, EEPROM, etc.) coupled with the bus 99 for storing static information and instructions for the processor 101. Computer system 100 may also include an optional data storage device 104 (e.g., thin profile removable memory) coupled with the bus 99 for storing information and instructions. It should be understood that device 104 may be removable. Furthermore, device 104 may also be a secure digital (SD) card reader or equivalent removable memory reader.

Also included in computer system 100 of FIG. 3 is an alphanumeric input device 106 which in one implementation is a handwriting recognition pad ("digitizer") and may include integrated push buttons in one embodiment. Device 106 can communicate information (spatial data and pressure data) and command selections to the central processor 101. The digitizer 106 records both the (x, y) coordinate value of the current location of the stylus 80 and also simultaneously records the pressure that the stylus 80 exerts on the face of the digitizer pad 106. The coordinate values (spatial information) and pressure data are then output on separate channels for sampling by the processor 101. In one implementation, there are roughly 256 different discrete levels of pressure that can be detected by the digitizer 106. Since the digitizer's channels are sampled serially by the processor 101, the stroke spatial data are sampled "pseudo" simultaneously with the associated pressure data. The sampled data is then stored in a memory by the processor 101 for later analysis.

System 100 of FIG. 3 also includes an optional cursor control or directing device 107 coupled to the bus 99 for communicating user input information and command selections to the central processor 101. In one implementation, device 107 is a touch screen device (also a digitizer) incorporated with display screen 105. Device 107 is capable of registering a position on the screen 105 where the stylus 80 makes contact and the pressure of the contact. The digitizer of 106 or 107 may be implemented using well known devices, for instance, using the ADS-7846 device by Burr-Brown that provides separate channels for spatial stroke information and pressure information.

Computer system 100 also contains a flat panel display device 105 coupled to the bus 99 for displaying information to the computer user. The display device 105 utilized with the computer system 100 may be a liquid crystal device (LCD), cathode ray tube (CRT), field emission device (FED, also called flat panel CRT), plasma or other display technology suitable for creating graphic images and/or alphanumeric characters recognizable to the user. In one embodiment, the display 105 is a flat panel multi-mode display capable of both monochrome and color display modes.

Also included in computer system 100 of FIG. 3 is a signal communication device 108 coupled to bus 99 that may be a serial port (or USB port) for enabling system 100 to communicate with the cradle 60. As mentioned above, in one embodiment, the communication interface 108 is a serial communication port, but could also alternatively be of any of a number of well known communication standards and protocols, e.g., parallel, SCSI, Ethernet, FireWire (IEEE 1394), USB, etc. In addition to device 108, wireless communication links can be established between the device 100 and a host computer system (or another portable computer system) using a Bluetooth wireless device 112, an infrared (IR) device 64, or a Global System for Messaging (GSM) radio device 114. System 100 may also include a wireless modem device 114 and/or a wireless radio, e.g., a GSM wireless radio with supporting chip set. The wireless modem device 114 is coupled to communicate with the central processor 101 but may not be directly coupled to port 108.

In one implementation, the Mobitex wireless communication system may be used to provide two way communication between computer system 100 and other networked computers and/or the Internet (e.g., via a proxy server). In other embodiments, transmission control protocol (TCP) can be used or Short Message Service (SMS) can be used. System 100 of FIG. 3 may also contain batteries (not shown) for providing electrical power.

Figure 4:
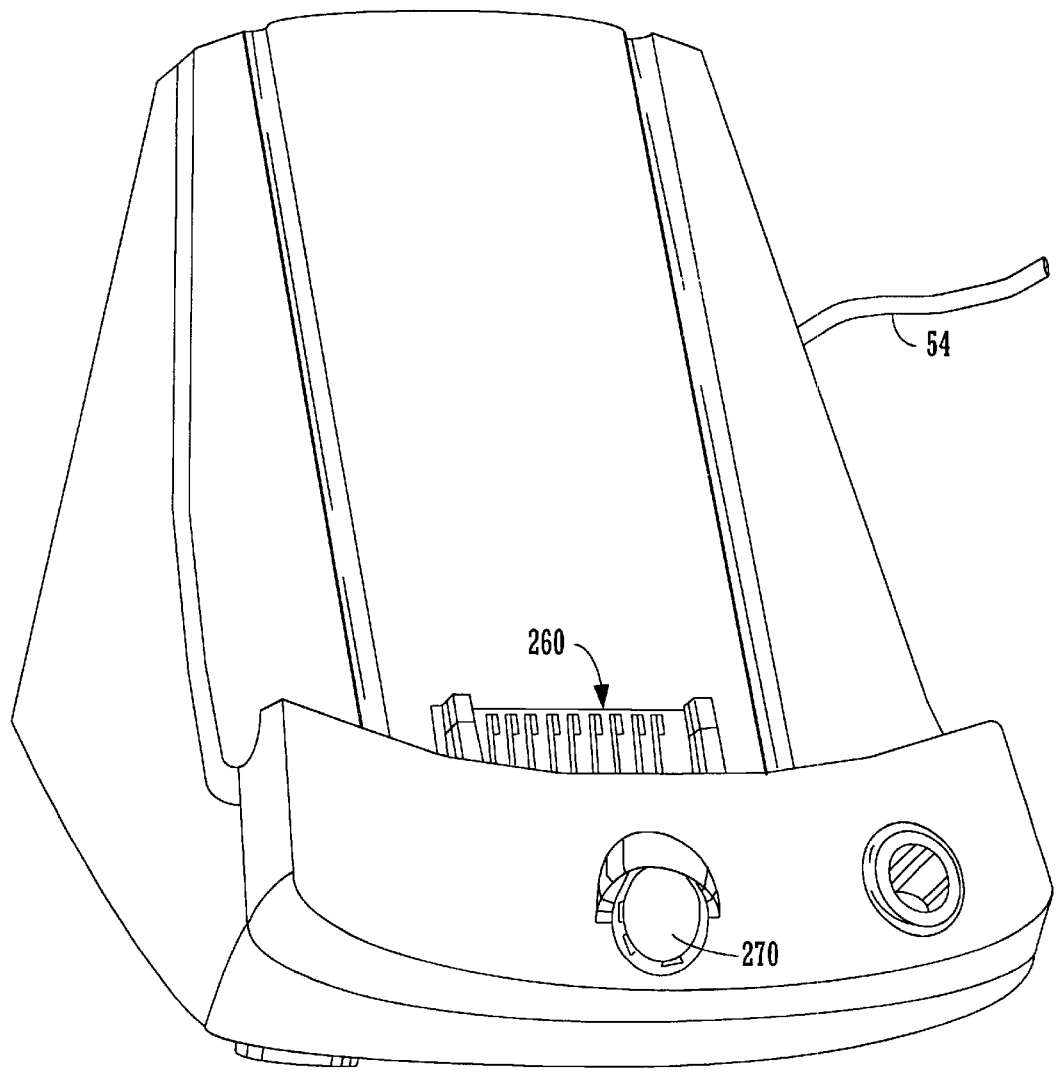
FIG. 4 is a perspective view of the cradle device for connecting the portable computing system to other systems via a communication interface.

FIG. 4 is a perspective illustration of one embodiment of the cradle 60 for receiving the portable computer system 100. The cradle 60 contains a mechanical and electrical interface 260 for interfacing with communication interface 108 (as shown in FIG. 2B) of computer system 100 when system 100 is slid into the cradle 60 in an upright position. Once inserted, button 270 can be pressed to initiate two way communication between portable computer system 100 and other computer systems (e.g., 56 and 58) coupled to communication bus 54.

EXEMPLARY NESTED FLIP COVERS IN ACCORDANCE WITH THE PRESENT INVENTION

Figure 5A:
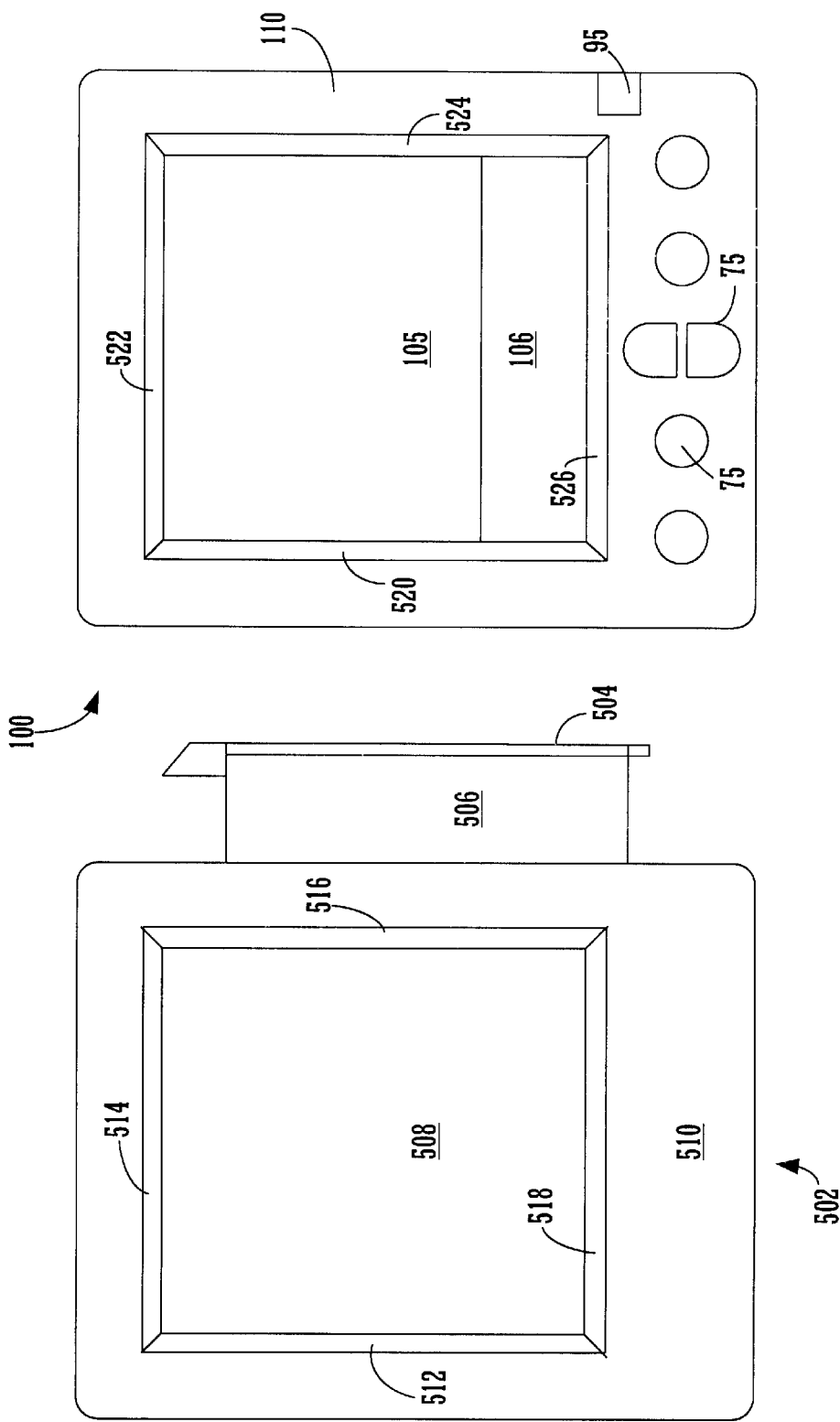
FIG. 5A is a top view of an embodiment of a nested flip cover lid in accordance with the present invention for a portable computing system.
Figure 5B:
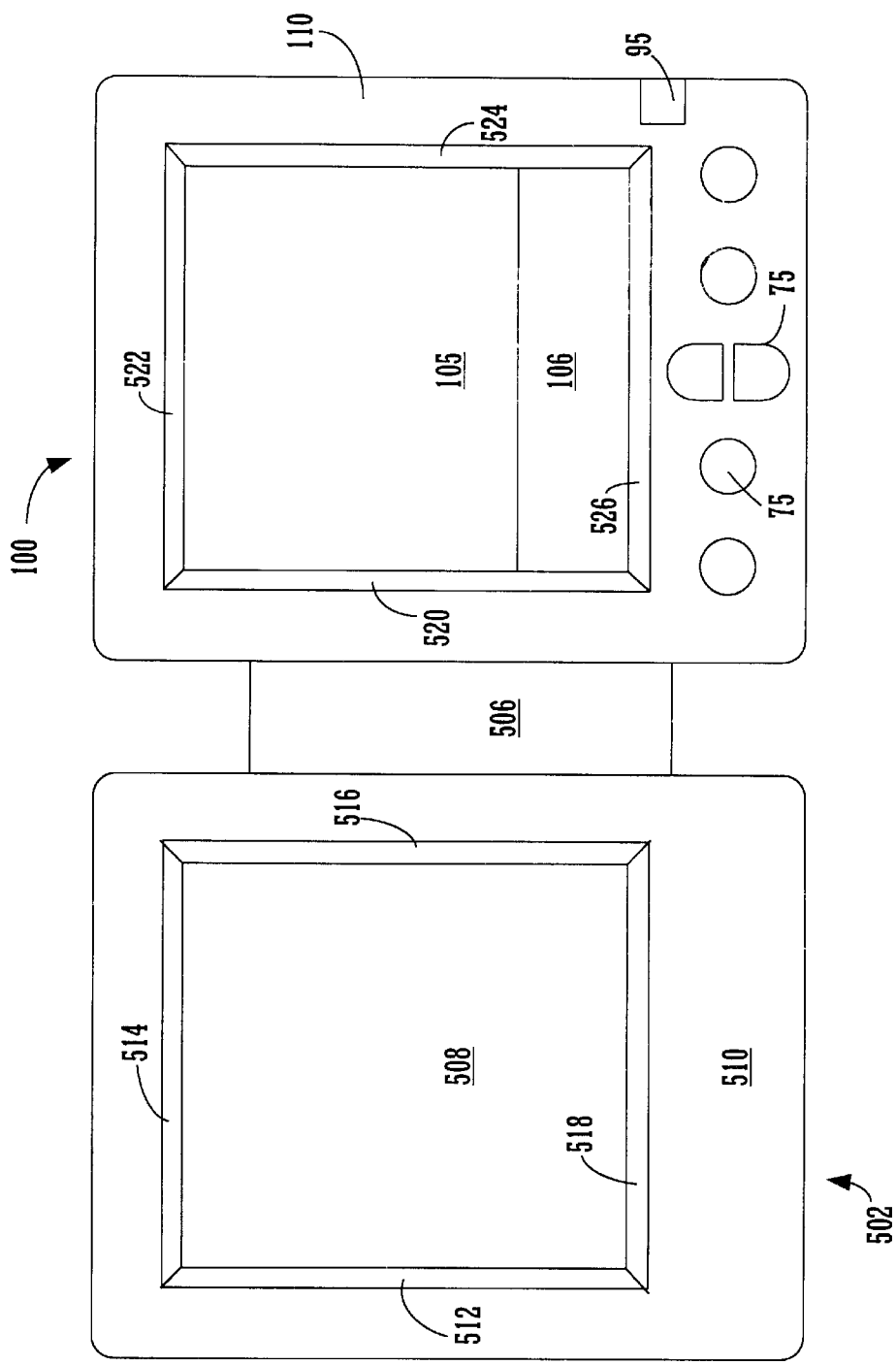
FIG. 5B is a top view of the nested flip cover of FIG. 5A attached to the portable computing system in accordance with an embodiment of the present invention.
Figure 5C:
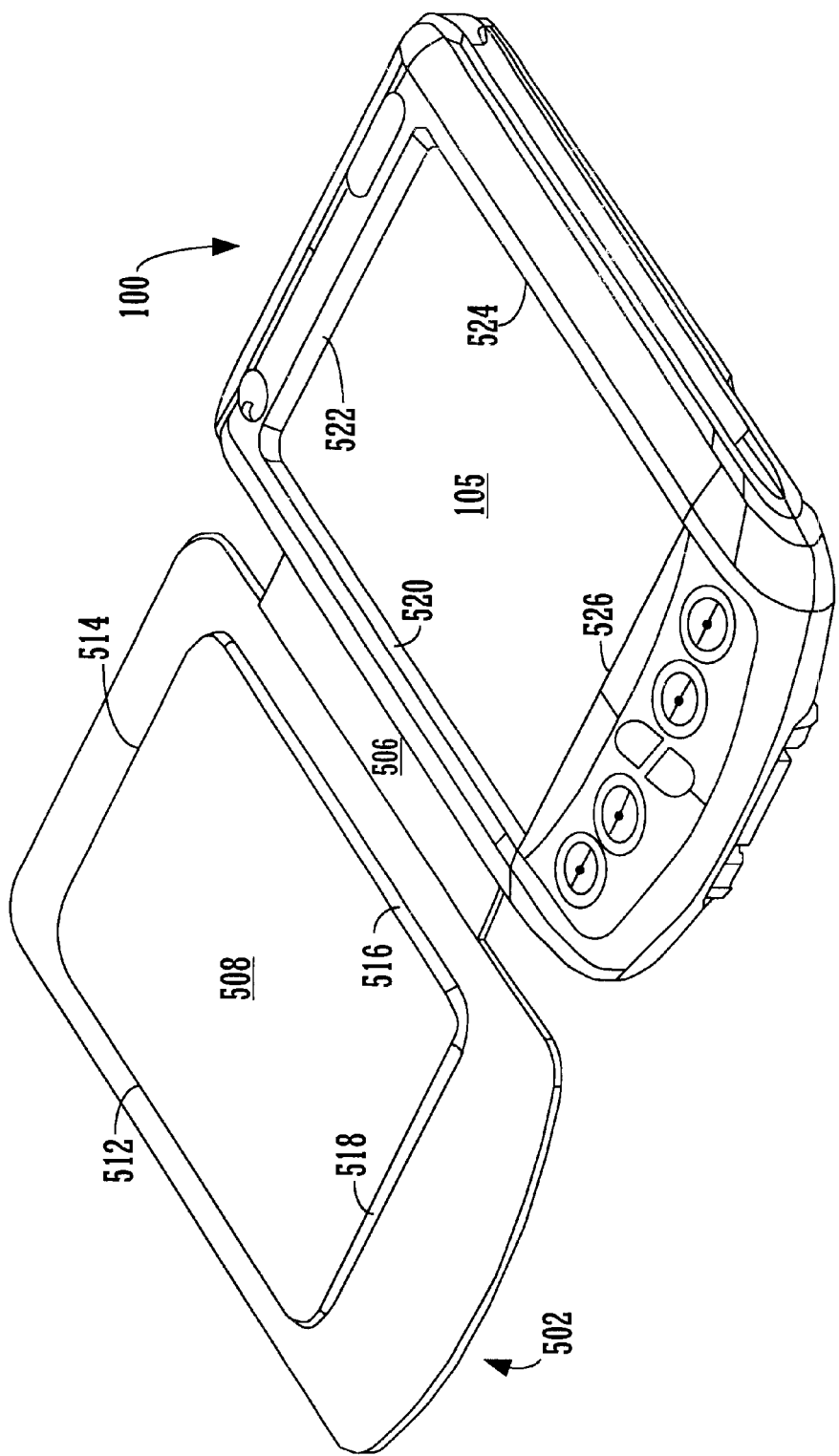
FIG. 5C is a perspective illustration of the nested flip cover of FIG. 5A attached to the portable computing system in accordance with one embodiment of the present invention.
Figure 5D:
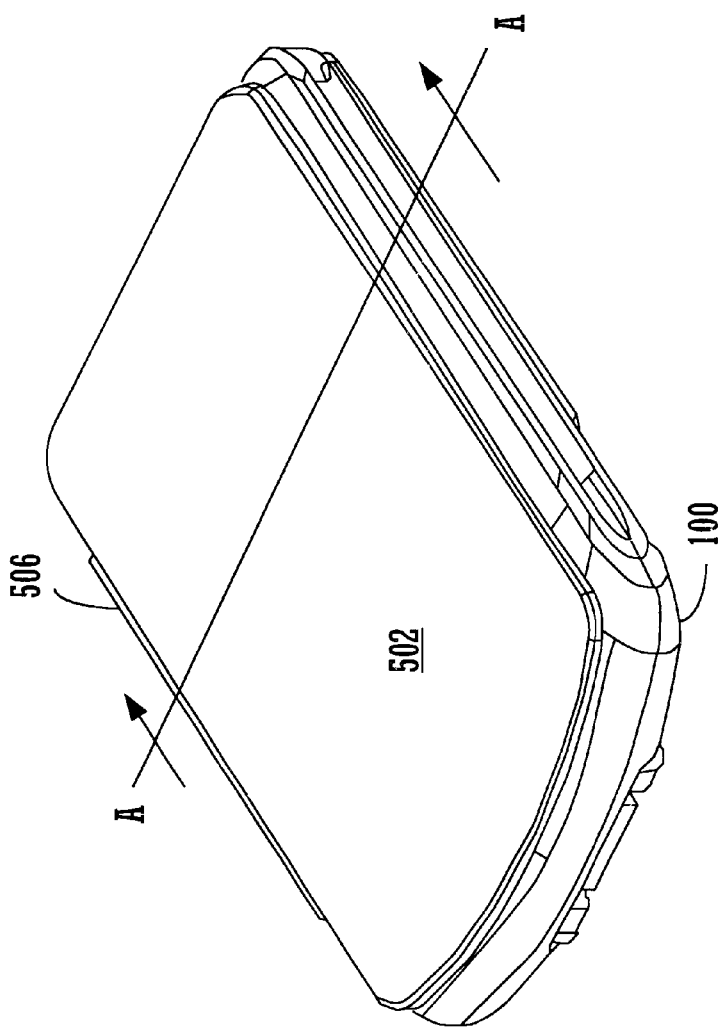
FIG. 5D is a perspective illustration of the nested flip cover of FIG. 5C in its closed position in accordance with one embodiment of the present invention.

It should be appreciated that FIGS. 5A, 5B, 5C, and 5D will be described in conjunction in order to more fully describe the structure of the present embodiment. FIG. 5A is a top view of an embodiment of a removable nested flip cover lid 502 in accordance with the present invention for portable computing system 100. Furthermore, FIG. 5B is a top view of the nested flip cover 502 attached to portable computing system 100 in accordance with an embodiment of the present invention. FIG. 5C is a perspective illustration of the removable nested flip cover 502 attached to the portable computing system 100 in accordance with one embodiment of the present invention. Additionally, FIG. 5D is a perspective illustration of the nested flip cover 502 of FIG. 5C in its closed position in accordance with one embodiment of the present invention.

Specifically, nested flip cover lid 502 (FIG. 5A) includes an accessory rail spine 504, a hinge 506 and a rigidity layer 510 that includes a raised area 508. When flip cover 502 is attached to portable computing system 100 (as shown in FIG. 5B) and in its closed position (FIG. 5D), the raised area 508 is specifically fabricated to nest within the parameter bevels 520–526 of the top cover 110 that surround display device 105 and digitizer 106 of portable computing system 100. In this manner, the raised area 508 is specifically fabricated to reside substantially below the top cover 110 and just above display area 105 and digitizer 106 when the nested flip cover 502 is in its closed position.

There are advantages associated with the nested flip cover 502 of the present embodiment. For example, one of the advantages of the nested flip cover 502 is that it is designed and fabricated to add a minimal amount of thickness (e.g., 1 millimeter) to portable computing system 100 when in its closed position (FIG. 5D). Furthermore, when flip cover 502 is attached to portable computing system 100 and in its closed position, the raised portion 508 of cover 502 keeps the nested flip cover 502 aligned with the outer parameter of portable computing device 100 thereby protecting its buttons 75 from being exposed and inadvertently activated.

The nest flip cover 502 of FIGS. 5A, 5B, and 5C includes a raised area 508 that define bevels 512–518 which are fabricated to nest and substantially match the shapes and angles of parameter bevels 520–526 of the top cover 110 of portable computing system 100. That is, bevel 512 of raised portion 508 is fabricated to substantially match the shape and angle of parameter bevel 524 of portable computing system 100 while bevel 516 of raised portion 508 is fabricated to substantially match the shape and angle of parameter bevel 520. Moreover, bevel 514 of raised portion 508 is fabricated to substantially match the shape and angle of parameter bevel 522 of portable computing system 100 while bevel 518 of raised portion 508 is fabricated to substantially match the shape and angle of parameter bevel 526. In this manner, the raised portion 508 is able to nest within parameter bevels 520–526 of the top cover 110 of portable computer 100 when in its closed position (FIG. 5D).

Figure 6A:
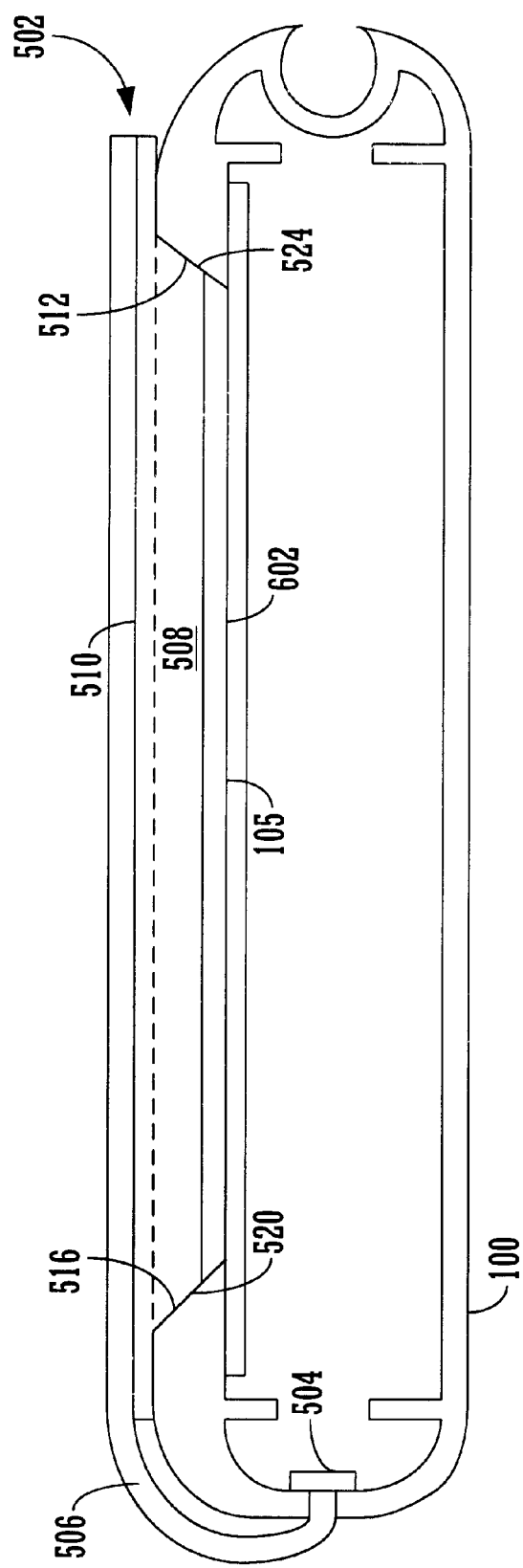
FIG. 6A is a side sectional view of the portable computing system and the closed nested flip cover of FIG. 5D.

FIG. 6A is a side sectional view of portable computing system 100 and the closed nested flip cover 502 of FIG. 5D along line A—A. Specifically, FIG. 6A illustrates that the bevel 516 of the raised area 508 of flip cover 502 substantially matches the shape and angle of parameter bevel 520 of the top cover 110 of portable computer system 100. Additionally, the bevel 512 of the raised area 508 substantially matches the shape and angle of parameter bevel 524 of the top cover 110 of portable computer 100. In this manner, the raised portion 508 of flip cover 502 nests substantially below the top cover 100 and just above display device 105. As such, a gap 602 is formed between the raised area 508 of flip cover 502 and the display device 105 of portable computing system 100. It is appreciated that gap 602 of the present embodiment may include a wide range of values. For example, within one embodiment of the present invention, gap 602 may be substantially equal to 0.3 millimeter (mm).

The nested flip cover 502 includes the accessory rail spine 504, hinge material layer 506 and the rigid layer of material 510 that includes the raised area 508. Specifically, the hinge material layer 506 is attached to the rail spine 504 while the rigid material layer 510 is attached to the hinge material layer 506. It is important to point out that the hinge material layer 506 becomes the top layer of nested flip cover 502. By fabricating nested flip cover 502 in this manner, its thickness is kept to a minimum. For example, the hinge material 506 may be fabricated from a leather having a thickness of 0.3 millimeter (mm) while the rigid material layer 510 may be fabricated from a plastic having a thickness of 0.6 mm (that does not include the additional thickness of the raised area 508). A lamination process may be utilized to attach the rigid material layer 510 to the hinge material 506 thereby adding a thickness of 0.1 mm to the nested flip cover 502. As such, nested flip cover 502 adds a thickness of substantially 1 mm to portable computing system 100 when in its closed position. Furthermore, it is appreciated that the rail spine 504, hinge material layer 506 and the rigid material layer 510 may be attached in a wide variety of ways in accordance with the present embodiment. For example, the rigid material 510 may be laminated and/or sown to the hinge material 506 within the present embodiment. Furthermore, the hinge material 506 may be glued to the rail spine 504.

Within FIG. 6A, it should be appreciated that one of the functions of material layer 510 is to provide enough rigidity to nested flip cover 502 to restrict it from flexing and rubbing against the display screen 105 and/or digitizer 106 of the portable computing system 100. Furthermore, the material layer 510 of the present embodiment may be fabricated from a wide variety of materials. For example, the material layer 510 that includes the raised area 508 may be fabricated from plastics, polycarbonites, metals, alloys, nylons, and the like. Moreover, it is understood that the accessory rail spine 504 and the hinge material layer 506 of the present embodiment may also be fabricated from a wide variety of materials. For example, the accessory rail spine 504 may be fabricated from plastics, polycarbonites, metals, alloys, nylons, and the like. Additionally, the hinge material 506 may be fabricated from leathers, nylons, rubbers, thermoplastic urethanes (TPUs), thermoplastic elastomers (TPEs), and the like. However, the hinge material layer 506, rail spine 504, and material layer 510 of the present embodiment are not limited to the particular materials mentioned above.

Figure 6B:
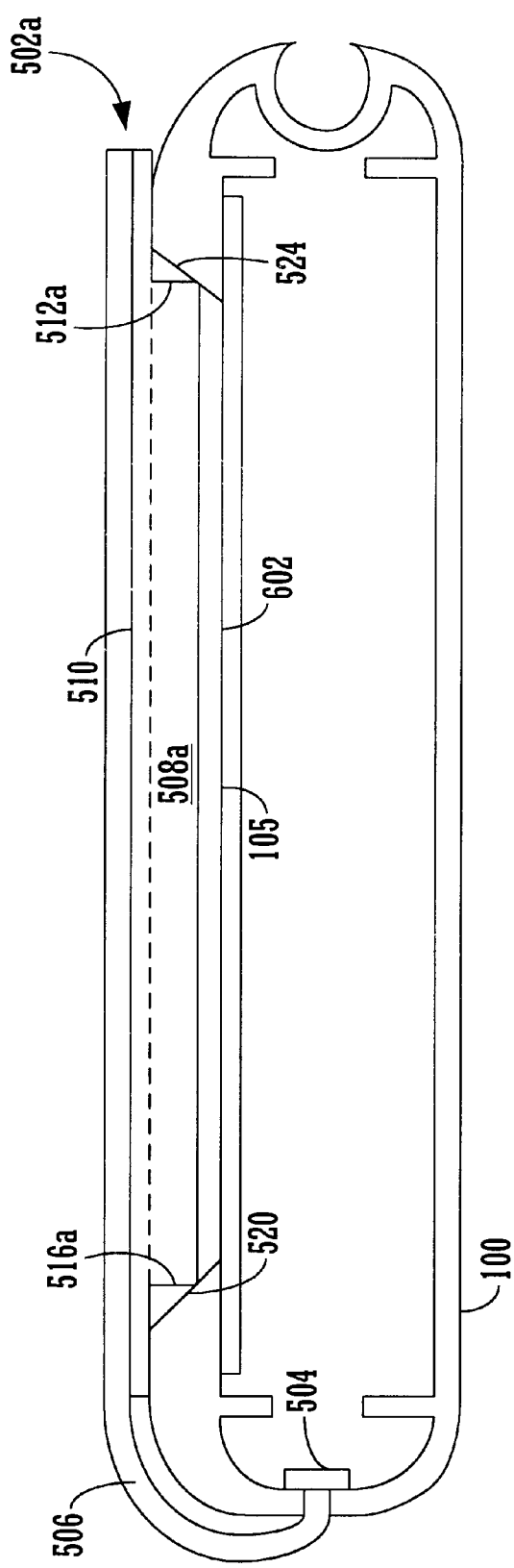
FIG. 6B is a side sectional view of the portable computing system and another embodiment of a closed nested flip cover in accordance with the present invention.

FIG. 6B is a side sectional view of portable computing system 100 and another embodiment of a closed nested flip cover 502a in accordance with the present invention along line A—A of FIG. 5D. It is appreciated that nested flip cover 502a of FIG. 6B is similar to the nested flip cover 502 of FIG. 6A. However, the raised area 508a of the nested flip cover 502a includes bevels 512a and 516a which are vertical surfaces and are not angled. Notwithstanding this difference, the raised portion 508a of flip cover 502a still nests substantially below the top cover 100 of portable computing system 100 and just above display device 105. Therefore, the raised portion 508a keeps the nested flip cover 502a aligned with the outer parameter of portable computing device 100 thereby protecting its buttons from being exposed and inadvertently activated.

Figure 7A:
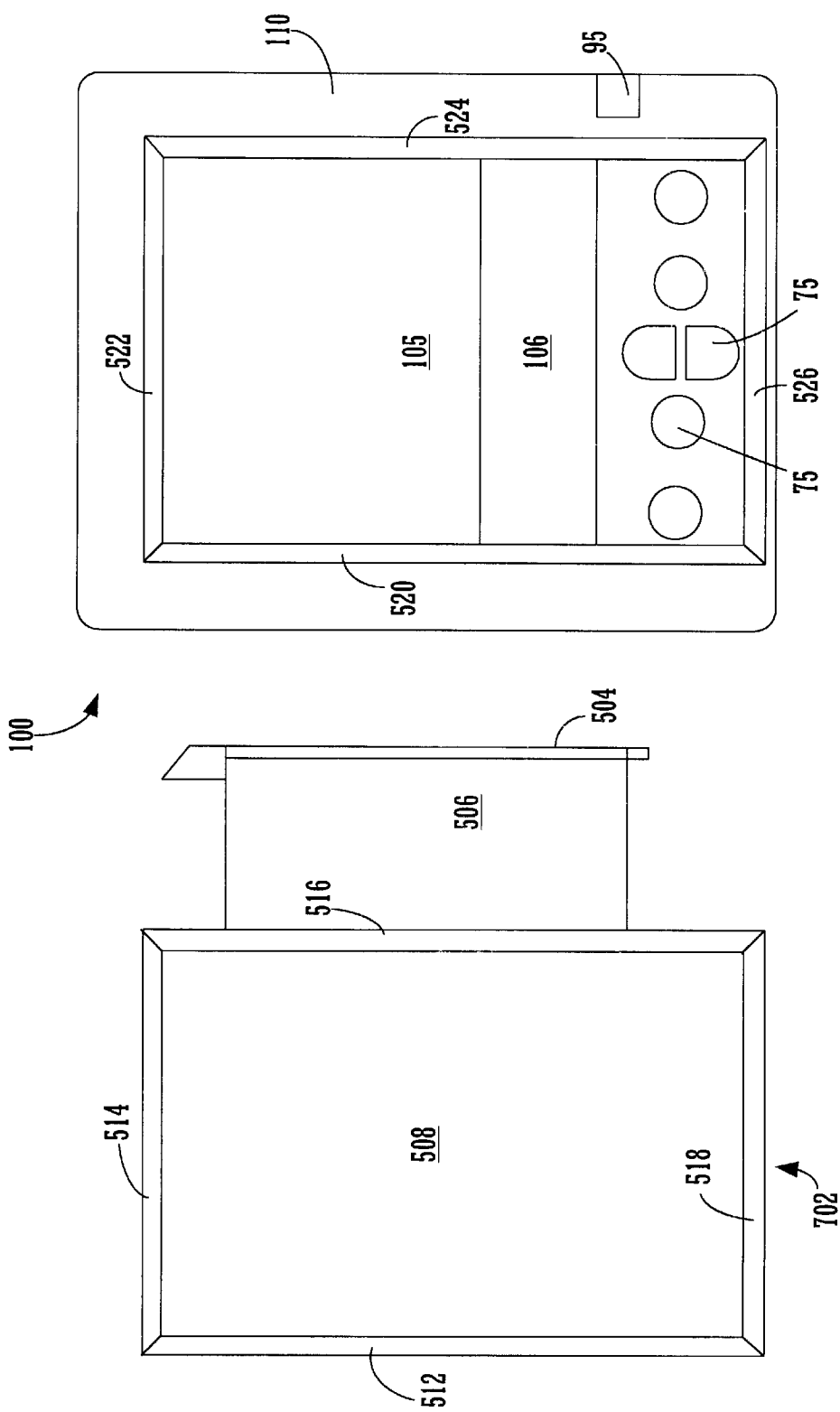
FIG. 7A is a top view of another nested flip cover for a portable computing system in accordance with an embodiment of the present invention.

FIGS. 7A and 7B will be described in conjunction in order to more fully describe the structure of the present embodiment. FIG. 7A is a top view of an embodiment of a removable nested flip cover 702 in accordance with the present invention for portable computing system 100. FIG. 7B is a top view of the nested flip cover 702 attached to the portable computing system 100 in accordance with an embodiment of the present invention. Within the present embodiment, when nested flip cover 702 is attached to portable computing system 100 (FIG. 7B) and in its closed position (not shown), flip cover lid 702 is fabricated to be substantially flush with the top cover 110 of portable computing system 100. In this manner, nested flip cover 702 adds a minimal amount of thickness (e.g., 0.3 millimeter) to portable computing system 100 when in its closed position. Furthermore, when flip cover 702 is attached to portable computing system 100 and in its closed position, the raised portion 508 of cover 702 keeps the nested flip cover 702 aligned thereby protecting its buttons 75 from being exposed and inadvertently activated.

It is understood that the nested flip cover 702 of FIGS. 7A and 7B is similar to the nested flip covers 502 and 502a of FIGS. 5A, 5B, 5C, 5D, 6A, and 6B. However, the nested flip cover 702 of FIGS. 7A and 7B is designed such that it adds even less thickness to portable computing system 100 when in its closed position. It is appreciated that the nested flip cover 702 and its components may be implemented in any manner described above with reference to nested flip covers 502 and 502a.

Figure 8A:
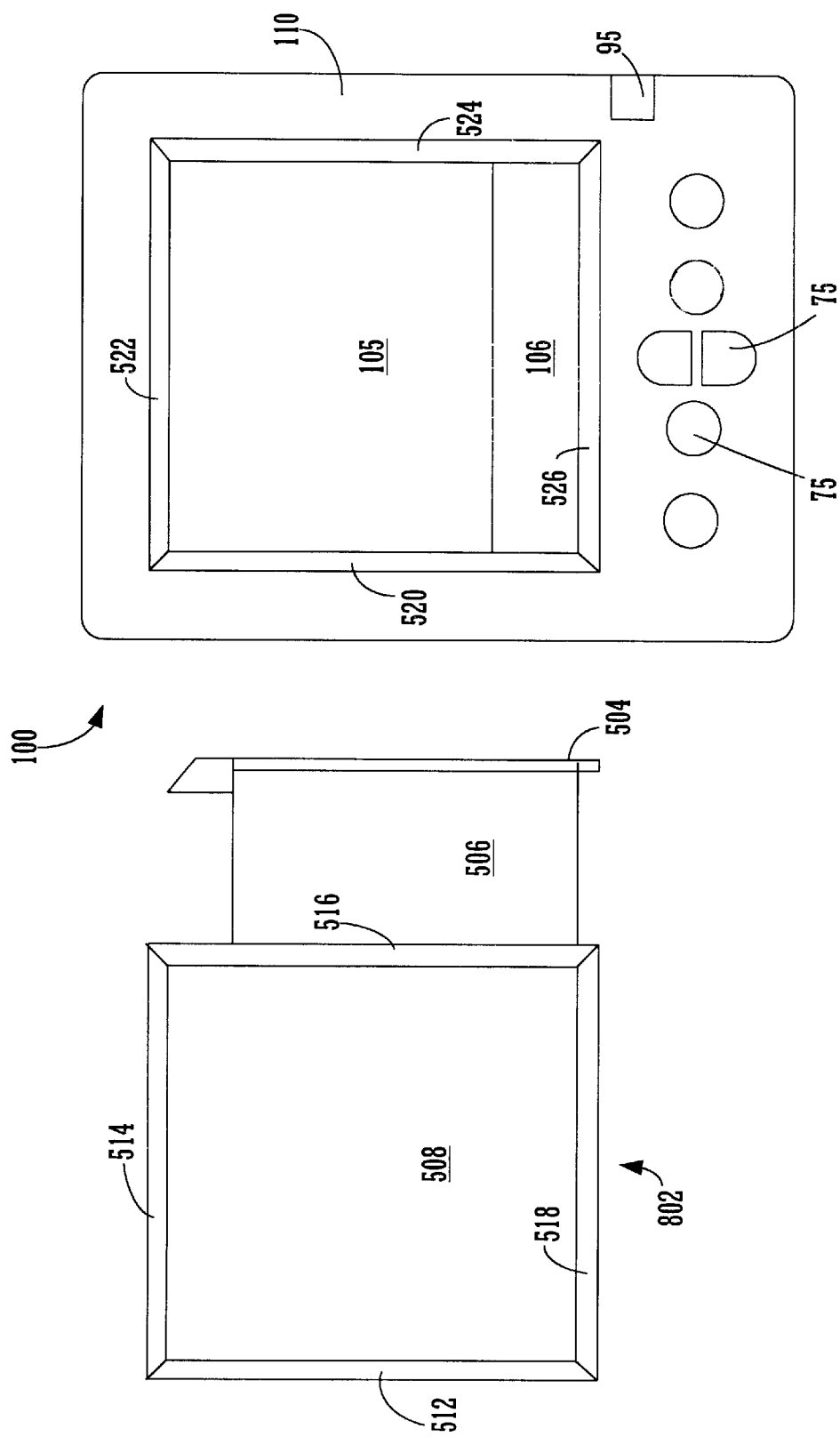
FIG. 8A is a top view of a short top nested flip cover for a portable computing system in accordance with an embodiment of the present invention.
Figure 8B:
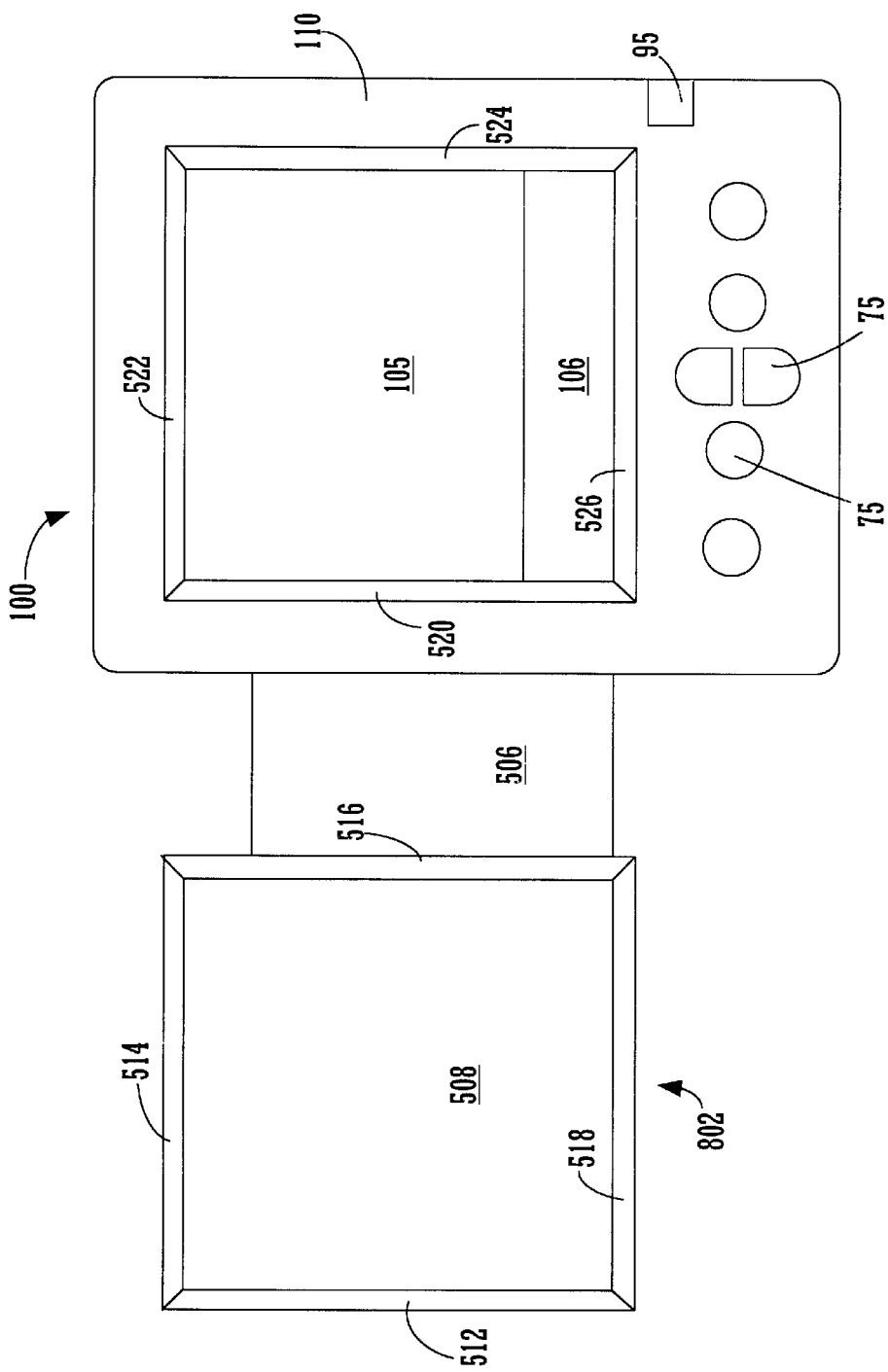
FIG. 8B is a top view of the short top nested flip cover of FIG. 8A attached to the portable computing system in accordance with an embodiment of the present invention.

FIGS. 5A and 8B will be described in conjunction in order to more fully describe the structure of the present embodiment. FIG. 8A is a top view a removable short top nested flip cover 802 in accordance with an embodiment of the present invention for portable computing system 100. FIG. 8B is a top view of the short top nested flip cover 802 attached to the portable computing system 100 in accordance with an embodiment of the present invention. Within the present embodiment, when short top nested flip cover 802 is attached to portable computing system 100 (FIG. 8B) and in its closed position (not shown), short top flip cover lid 802 is fabricated to be substantially flush with the top cover 110 of portable computing system 100 and covers display device 105 and digitizer 106. In this manner, short top flip cover 802 adds a minimal amount of thickness (e.g., 0.3 millimeter) to portable computing system 100 when in its closed position. Moreover, when short top nested flip cover 802 is attached to portable computing system 100 and in its closed position, the raised area 508 keeps the short top nested flip cover 802 aligned with the parameter bevels 520–526 of the top cover 110 of portable computing device 100 thereby protecting display device 105 and digitizer 106.

It is appreciated that the short top nested flip cover 802 of FIGS. 8A and 8B is similar to the nested flip covers 502 and 502a of FIGS. 5A, 5B, 5C, 5D, 6A, and 6B. However, the nested flip cover 802 of FIGS. 8A and 8B is designed such that it covers display device 105 and digitizer 106 of portable computing system 100. Moreover, the nested flip cover 802 is designed such that it adds a minimal amount of thickness to portable computing system 100 when in its closed position. It is understood that the nested flip cover 802 and its components may be implemented in any manner described above with reference to nested flip covers 502 and 502a.

It should be pointed out that some portable computing systems are specifically designed such that they are activated when one or more of their buttons (e.g., 75) are pushed. Therefore, it may not be appropriate to utilize the short top flip cover 802 of FIG. 8A and 8B with these types of portable computing systems since it does not prevent the buttons 75 of portable computing system 100 from being inadvertently depressed. However, it may be appropriate to utilize the short top nested flip cover 802 with portable computing system (e.g., 100) that are not activated when one or more of their buttons (e.g., 75) are inadvertently depressed. Furthermore, it may be appropriate to utilize the short top nested flip cover 802 or the nested flip cover 702 (FIGS. 7A and 7B) with portable computing systems (e.g., 100) that are not easily activated when their on/off button (e.g., 95) is inadvertently depressed.

Figure 9:
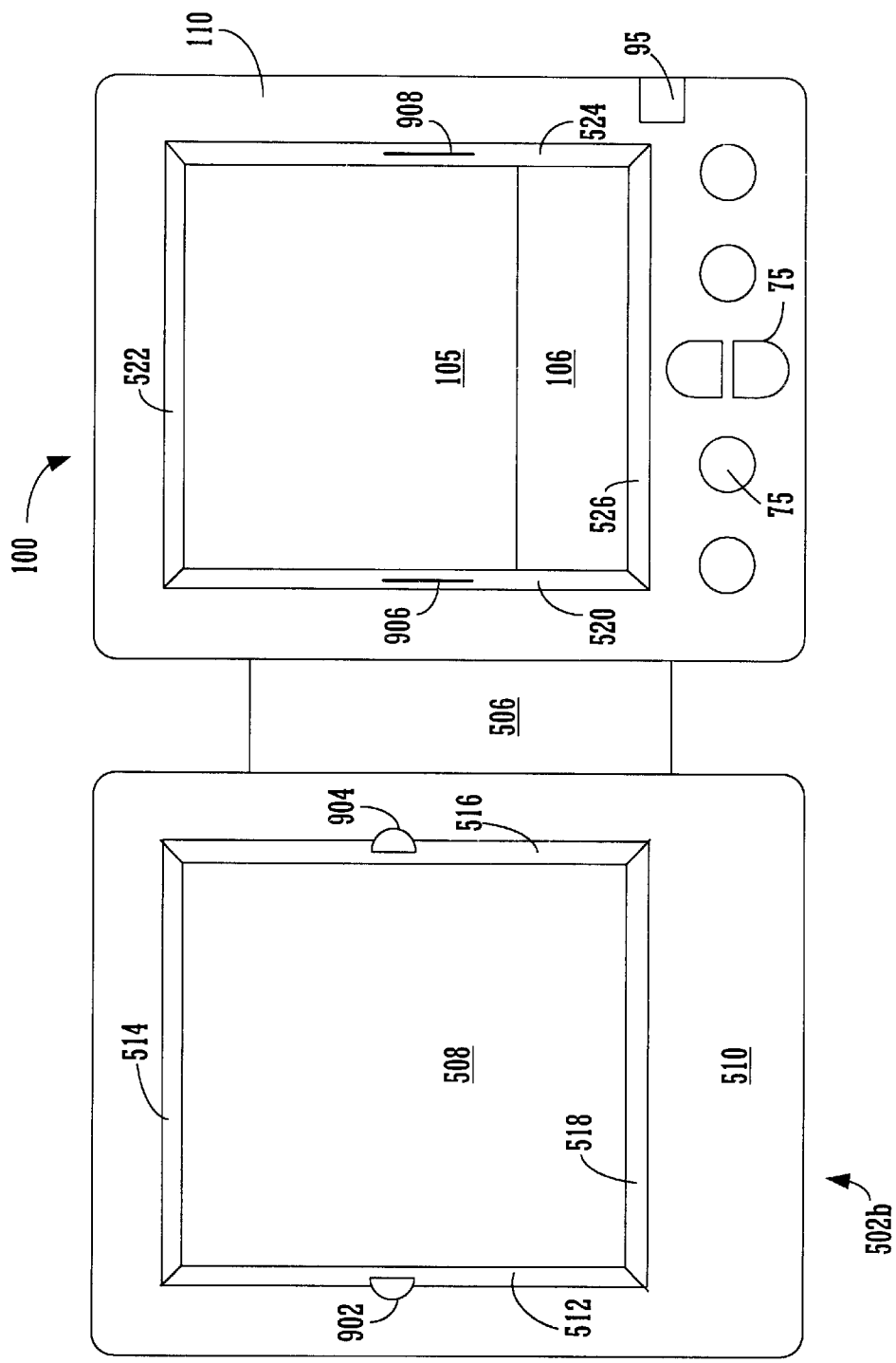
FIG. 9 is a top view of a nested flip cover implemented with latching mechanisms in accordance with an embodiment of the present invention.

FIG. 9 is a top view of a removable nested flip cover lid 502b implemented with latching mechanisms 902 and 904 in accordance with an embodiment of the present invention. It is appreciated that nested flip cover 502b is similar to nested flip covers 502 and 502a described above. However, when nested flip cover 502b of FIG. 9 is in its closed position (not shown), the latching mechanisms 902 and 904 (which are implemented as part of bevels 512 and 516, respectively) are fabricated to latch into recesses 906 and 908 formed within parameter bevels 520 and 524 of the top cover 100 of portable computing system 100. Specifically, when nested flip cover 502b is closed, latching mechanism 902 of flip cover 502b latches into recess 908 while latching mechanism 904 latches into recess 906. In this manner, the combination of the latching mechanisms 902 and 904 and recesses 906 and 908 keep the raised portion 508 of the closed flip cover 502b nested within parameter bevels 520–526 of the top cover 110 of portable computer 100. Furthermore, the combination of the latching mechanisms 902 and 904 and slots 906 and 908 keep the closed flip cover 502b aligned with the outer parameter of portable computing device 100 thereby protecting its buttons 75 from being exposed and inadvertently activated.

Within another embodiment, it is appreciated that nested flip cover lid 502b may be implemented with one latching mechanism (e.g., 902 or 904) while a parameter bevel (e.g., 520 or 524) of portable computer 100 includes its corresponding recess (e.g., 906 or 908). Within yet another embodiment, one or more latching mechanisms similar to 902 and 904 may be implemented as part of one or more of the bevels (e.g., 512–518) of the raised area 508 of nested flip cover 502b. It is understood that one or more corresponding recesses (e.g., 906 and 908) would be formed within one or more of the parameter bevels (e.g., 520–526) of the top cover 110 of portable computing system 100.

It should be understood that nested flip cover lid 502b of FIG. 9 may be implemented with a wide variety of latching mechanisms in order to secure it to the top cover 110 of portable computing system 100. For example, latching mechanisms of the present embodiment may include microlatches, pliable material (e.g., Mylar®, plastic, nylons, etc.), and the like. Moreover, latching mechanisms may be implemented with any component of nested flip cover 502b in accordance with an embodiment of the present invention. Additionally, a recess or slot for receiving a latching mechanism may be implemented with any component of portable computing system 100 in accordance with an embodiment of the present invention. Conversely, a latching mechanism in accordance with an embodiment of the present invention may not utilize a recess or slot to remain secure.

It is appreciated that any flip cover (e.g., 502, 502a, 702, and 802) described above may be implemented with a latching mechanism (e.g., 902 and/or 904) while its portable computing system (e.g., 100) may be implemented with corresponding recesses (e.g., 906 and/or 908) or latching points. Furthermore, any of the flip covers described above may be implemented with a wide variety of latching mechanisms in order to secure it to its portable computing system (e.g., 100).

FIG. 10 illustrates a flowchart 1000 of steps performed in accordance with one embodiment of the present invention for designing and fabricating a flip cover lid (e.g., 502) that nests within parameter bevels of a top cover of a portable computing system (e.g., 100). Although specific steps are disclosed in flowchart 1000, such steps are exemplary. That is, the present invention is well suited to performing various other steps or variations of the steps recited in FIG. 10. Within the present embodiment, it should be appreciated that the steps of flowchart 1000 may be performed by software or hardware or any combination of software and hardware.

At step 1002, the present embodiment designs and fabricates a flip cover rail spine (e.g., 504) that may be attached to a portable computing system (e.g., 100). It is appreciated that the flip cover rail spine of the present embodiment is well suited to be fabricated from a wide variety of materials. For example, the flip cover rail spine of the present embodiment may be fabricated from plastics, polycarbonites, metals, alloys, nylons, and the like. In step 1004, the present embodiment attaches the flip cover rail spine (e.g., 504) to a hinge material (e.g., 506) which is substantially the size of the desired flip cover. It is understood that the flip cover rail spine may be attached to the hinge material in a wide variety of ways at step 1004. For example, the flip cover rail spine may be glued to the hinge material. Additionally, the hinge material of the present embodiment may be a wide variety of materials. For example, the hinge material of the present embodiment may include leathers, nylons, rubbers, thermoplastic urethanes (TPUs), thermo-plastic elastomers (TPEs), and the like.

In step 1006 of FIG. 10, the present embodiment fabricates a rigid layer (e.g., 510) having a raised area (e.g., 508) that may nest within parameter bevels of a top cover (e.g., 110) that surrounds a display device (e.g., 105) of the portable computing system (e.g., 100). It is appreciated that the rigid layer of the present embodiment is well suited to be fabricated from a wide variety of materials. For example, the rigid layer of the present embodiment may be fabricated from plastics, polycarbonites, metals, alloys, nylons, and the like.

At step 1008, the present embodiment attaches the rigid layer (e.g., 510) to the hinge material (e.g., 506) in order to form a nested flip cover (e.g., 502) for the portable computer (e.g., 100). It is understood that the rigid layer may be attached to the hinge material in a wide variety of ways in accordance with the present embodiment. For example, the rigid layer of the present embodiment may be laminated and/or sown to the hinge material at step 1008. In step 1010, the present embodiment attaches the nested flip cover (e.g., 502) to the portable computing system (e.g., 100). Once step 1010 is completed, the present embodiment exits flowchart 1000.

Accordingly, the present invention provides a method and apparatus that provides a flip cover to a personal digital assistant that adds a minimal amount of thickness to the personal digital assistant. Additionally, the present invention provides a method and apparatus that also restricts the flip cover from becoming misaligned with the outer parameter of its personal digital assistant.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A flip cover for covering a portion of a front surface of a portable computing system, said flip cover comprising:
   an apparatus for attaching to said portable computing system;
   a hinge material attached to said apparatus; and
   a material forming a raised area that is for nesting within display parameter bevels of a top cover of said portable computing system, wherein said material is attached to said hinge material.

2. The flip cover as described in claim 1 wherein said apparatus comprises a rail spine.

3. The flip cover as described in claim 1 wherein said hinge material is selected from a leather, a nylon, a rubber, a thermo-plastic urethane (TPU) and a thermo-plastic elastomer (TPE).

4. The flip cover as described in claim 1 wherein said material comprises a rigid material.

5. The flip cover as described in claim 1 further comprising a latching mechanism for securing said flip cover to said top cover of said portable computing system.

6. The flip cover as described in claim 1 wherein said portable computing system comprises a personal digital assistant (PDA).

7. The flip cover as described in claim 4 wherein said rigid material is selected from a plastic, a polycarbonite, a metal, an alloy and a nylon.

8. The flip cover as described in claim 5 wherein said portable computing system comprises a latching point for receiving said latching mechanism.

9. The flip cover as described in claim 5 wherein said latching mechanism is selected from a pliable material and a micro-latch.

10. The flip cover as described in claim 9 wherein said pliable material is selected from a Mylar, a plastic and a nylon.

11. A removable flip cover for covering a portion of a front surface of a portable computing system, said removable flip cover comprising:
    an apparatus for attaching to said portable computing system;
    a hinge material attached to said apparatus; and
    a material forming a raised area that is for nesting within display parameter bevels of a top cover of said portable computing system, wherein said material is attached to a surface of said hinge material;
    wherein said removable flip cover is for removably attaching to said portable computing system to cover said portion of said front surface.

12. The removable flip cover as described in claim 11 wherein said apparatus comprises a rail spine.

13. The removable flip cover as described in claim 11 wherein said hinge material is selected from a leather, a nylon, a rubber, a thermo-plastic urethane (TPU) and a thermo-plastic elastomer (TPE).

14. The removable flip cover as described in claim 11 wherein said material comprises a rigid material.

15. The removable flip cover as described in claim 11 further comprising a latching mechanism for securing said removable flip cover to said top cover of said portable computing system.

16. The removable flip cover as described in claim 11 wherein said portable computing system comprises a personal digital assistant (PDA).

17. The removable flip cover as described in claim 14 wherein said rigid material is selected from a plastic, a polycarbonite, a metal, an alloy and a nylon.

18. The removable flip cover as described in claim 15 wherein said portable computing system comprises a latching point for receiving said latching mechanism.

19. The removable flip cover as described in claim 15 wherein said latching mechanism is selected from a pliable material and a micro-latch.

20. The removable flip cover as described in claim 19 wherein said pliable material is selected from a Mylar®, a plastic and a nylon.

21. A flip cover for covering a portion of a front surface of a personal digital assistant, said flip cover comprising:

an apparatus for attaching to said personal digital assistant;

a hinge material attached to said apparatus; and a material forming a raised area that is for nesting within display parameter bevels of a top cover of said personal digital assistant, wherein said material is attached to said hinge material.

22. The flip cover as described in claim 21 wherein said apparatus comprises a rail spine.

23. The flip cover as described in claim 21 wherein said hinge material is selected from a leather, a nylon, a rubber, a thermoplastic urethane (TPU) and a thermo-plastic elastomer (TPE).

24. The flip cover as described in claim 21 wherein said material comprises a rigid material.

25. The flip cover as described in claim 21 further comprising a latching mechanism for securing said flip cover to said top cover of said personal digital assistant.

26. The flip cover as described in claim 24 wherein said rigid material is selected from a plastic, a polycarbonite, a metal, an alloy and a nylon.

27. The flip cover as described in claim 25 wherein said personal digital assistant comprises a latching point for receiving said latching mechanism.

28. The flip cover as described in claim 25 wherein said latching mechanism is selected from a pliable material and a micro-latch.

29. The flip cover as described in claim 27 wherein said latching point comprises a recess within said top cover of said personal digital assistant.

30. The flip cover as described in claim 28 wherein said pliable material is selected from a Mylar®, a plastic and a nylon.

* * * * *